(12) United States Patent
Aviles

(10) Patent No.: US 7,571,721 B2
(45) Date of Patent: *Aug. 11, 2009

(54) BAFFLE-TYPE GREASE FILTER FOR KITCHEN VENTILATORS

(75) Inventor: Josue V Aviles, Philadelphia, PA (US)

(73) Assignee: Franklin Machines Products, Lumberton, NJ (US)

( * ) Notice: Subject to any disclaimer, the term of this patent is extended or adjusted under 35 U.S.C. 154(b) by 814 days.

This patent is subject to a terminal disclaimer.

(21) Appl. No.: 11/226,140

(22) Filed: Sep. 14, 2005

(65) Prior Publication Data

US 2007/0056578 A1 Mar. 15, 2007

(51) Int. Cl.
*F24C 15/20* (2006.01)

(52) U.S. Cl. .............. 126/299 D; 126/299 R; 55/DIG. 36; 55/444; 55/493

(58) Field of Classification Search ............. 126/299 R, 126/299 E, 299 D; 55/DIG. 36, 444, 471, 55/443, 462, 493, 385.3; 454/67, 49; 431/289, 431/296, 253, 343
See application file for complete search history.

(56) References Cited

U.S. PATENT DOCUMENTS

| | | |
|---|---|---|
| 3,364,664 A | 1/1968 | Doane |
| 3,376,804 A | 4/1968 | Marks |
| 3,566,585 A | 3/1971 | Voloshen et al. |
| 3,813,856 A | 6/1974 | Jensen ................ 55/444 |
| 3,834,135 A | 9/1974 | Jordan ................ 55/444 |
| 3,870,494 A | 3/1975 | Doane ................ 55/443 |
| 3,910,782 A | 10/1975 | Struble et al. ........... 55/444 |
| 3,945,812 A | 3/1976 | Doane .................. 55/97 |
| 3,955,949 A | 5/1976 | Rohrer ................. 55/444 |
| 4,189,990 A | 2/1980 | Kittler ................. 98/121 R |
| 4,319,898 A | 3/1982 | Maierhofer ............. 55/322 |
| 4,690,701 A | 9/1987 | Hedrick et al. .......... 55/436 |
| 5,302,174 A | 4/1994 | Guetersloh ............. 55/444 |
| 5,320,656 A | 6/1994 | Hammer ............... 55/444 |
| 5,342,422 A | 8/1994 | Wimbock .............. 55/444 |
| 6,041,774 A | 3/2000 | Ward et al. |
| 6,454,825 B1 | 9/2002 | Cheimets et al. ......... 55/446 |
| 6,543,526 B2 * | 4/2003 | Jacobs ................. 165/144 |
| 6,656,244 B1 * | 12/2003 | Galassi ................ 55/444 |
| 6,840,975 B2 | 1/2005 | Bohacik ............... 55/442 |
| 6,878,175 B2 * | 4/2005 | Keller et al. ............ 55/320 |
| 7,150,774 B2 * | 12/2006 | Kubokawa et al. ....... 55/521 |

OTHER PUBLICATIONS

Quest Metal Products Limited, "Fireguard Filter", 2 page brochure, Feb. 1977.
Commonly-Owned, Co-Pending, Unpublished U.S. Appl. No. 12/023,178, filed Jan. 31, 2008.
Office Action dated Jan. 27, 2009 issued in Commonly-Owned, Co-Pending U.S. Appl. No. 12/023,178.

* cited by examiner

*Primary Examiner*—Kenneth B Rinehart
*Assistant Examiner*—Daniel A Bernstein
(74) *Attorney, Agent, or Firm*—Howson & Howson LLP

(57) ABSTRACT

A grease filter has upper and lower baffle assemblies that define tortuous paths for exhaust air flowing therethrough. A hinge connects the upper and lower baffle assemblies and permits the assemblies to pivot from a closed position to an open position. In the open position, access is provided to all surfaces of the assemblies so that they can be efficiently cleaned. A locking mechanism secures the baffle assemblies in the closed position and is located on a peripheral side of the assemblies opposite the hinge. A kitchen ventilation system and method of cleaning a grease filter are also provided.

14 Claims, 3 Drawing Sheets

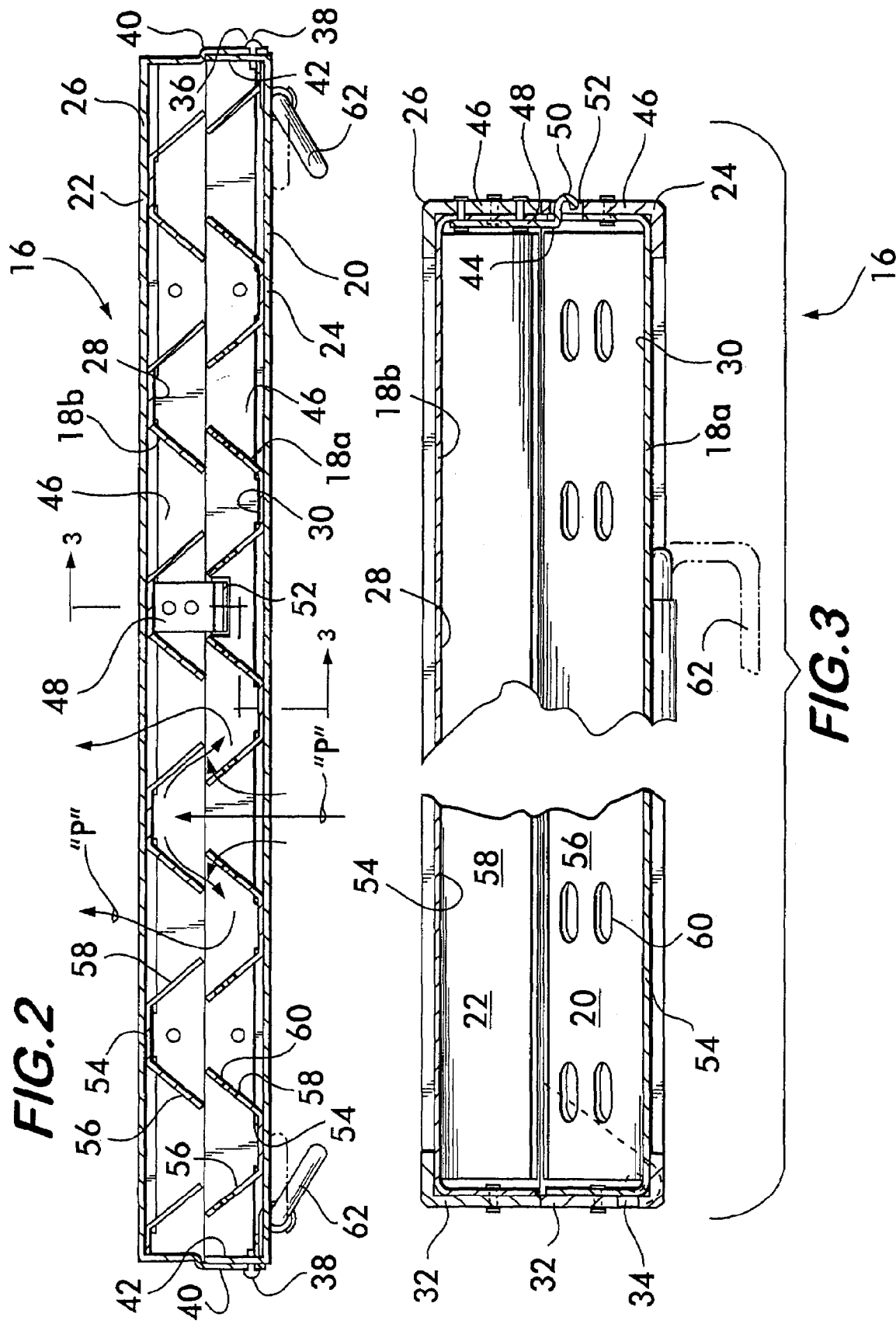

BAFFLE-TYPE GREASE FILTER FOR KITCHEN VENTILATORS

BACKGROUND OF THE INVENTION

The present invention relates to a grease filter of the type employed in canopies or hoods overlying relatively large grills, broilers, ranges, stoves and like equipment in kitchens of restaurants and other facilities where food is prepared.

Grease filters are typically provided with a rectangular frame to which rows of baffles are secured in staggered relation to form a grease and/or flame retarding filter for a kitchen exhaust/ventilation system. Examples of such filters are disclosed in U.S. Pat. No. 3,566,585 issued to Voloshen et al.; U.S. Pat. No. 3,813,856 issued to Jensen; U.S. Pat. No. 3,834,135 issued to Jordan; U.S. Pat. Nos. 3,870,494 and 3,945,812 issued to Doane; U.S. Pat. No. 3,910,782 issued to Struble et al.; and U.S. Pat. No. 3,955,949 issued to Rohrer. Also see U.S. Pat. No. 4,690,701 issued to Hedrick et al.; U.S. Pat. No. 4,319,898 issued to Maierhofer; U.S. Pat. No. 3,364,664 issued to Doane; U.S. Pat. No. 3,376,804 issued to Marks; U.S. Pat. No. 4,189,990 issued to Kittler; U.S. Pat. No. 5,302,174 issued to Guetersloh; U.S. Pat. No. 5,320,656 issued to Hammer; U.S. Pat. No. 5,342,422 issued to Wimbock; U.S. Pat. No. 6,454,825 B1 issued to Chemets et al.; U.S. Pat. No. 6,656,244 B1 issued to Galassi; and U.S. Pat. No. 6,840,975 B2 issued to Bohacik that disclose other baffled filter structures.

While the grease filters disclosed in the above referenced patents may function in a satisfactory manner for their intended purposes, there remains a need for a re-useable grease filter which enables ready cleaning of all filter surfaces. Preferably, the grease filter should be capable of being positioned in a closed condition for extracting grease from grease-laden exhaust air and an open position for permitting direct cleaning of all filter surfaces. In addition, preferably the grease filter should include a locking mechanism capable of preventing undesired opening of the filter during use.

SUMMARY OF THE INVENTION

The present invention provides a grease filter having upper and lower baffle assemblies which, in a closed position, define tortuous paths for exhaust air flowing therethrough. A hinge connects the upper and lower baffle assemblies together and permits the assemblies to pivot relative to one another from the closed position to an open position which enables ready access to all surfaces of the assemblies for cleaning purposes. The filter also includes a locking mechanism for securing the baffle assemblies in the closed position. The locking mechanism is located on a peripheral side of the assemblies opposite the hinge.

According to another aspect of the present invention, a kitchen ventilating system is provided. The system includes a food preparation apparatus selected from a group consisting of a grill, a broiler, a range and a stove, and a canopy located above the apparatus for exhausting air rising upwardly from the apparatus and laden with grease and/or oil vapors. A grease filter, as discussed above, is mounted within a mouth of the canopy and is removable therefrom for cleaning.

According to a further aspect of the present invention, a method of cleaning a grease filter of a kitchen ventilating system is provided. A grease filter, as described above, is removed from a mouth of a canopy located above food preparation apparatus. A locking mechanism that is located on a peripheral side of the assemblies opposite the hinge and that secures the assemblies in a closed position is unlocked. Thereafter, the upper and lower baffle assemblies are pivoted relative to each other about the hinge thereby placing the assemblies in an open position. In this position, all surfaces of the upper and lower assemblies are cleaned.

BRIEF DESCRIPTION OF THE DRAWINGS

The foregoing and other objects, features and advantages of the present invention should become apparent from the following description when taken in conjunction with the accompanying drawings, in which:

FIG. 2 is a cross-sectional view of the grease filter along line 2-2 of FIG. 1;

FIG. 3 is an enlarged, discontinuous cross-sectional view of the grease filter along line 3-3 of FIG. 2.

DETAILED DESCRIPTION OF THE PREFERRED EMBODIMENT

Figure 1:
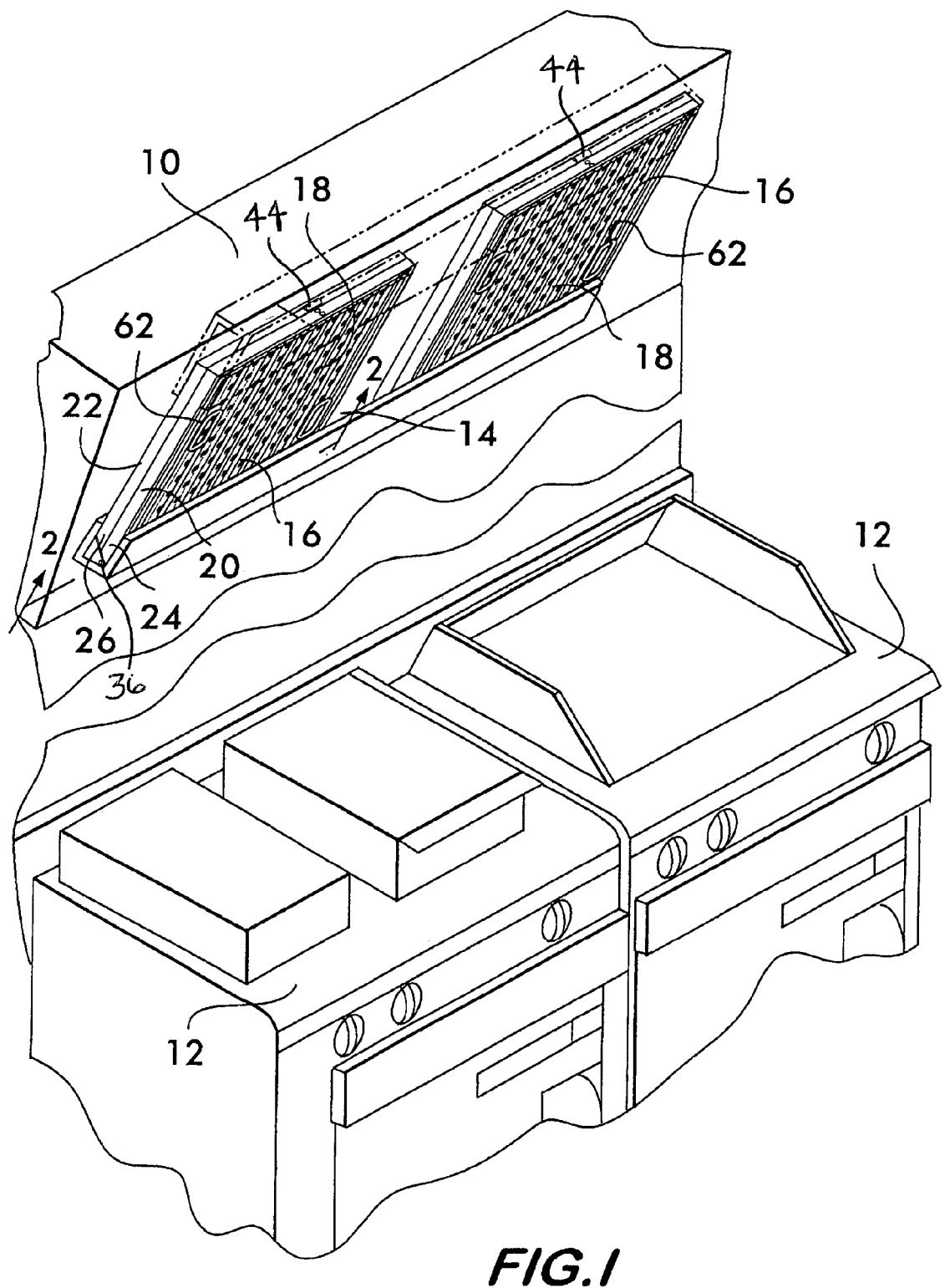
FIG. 1 is a perspective view of a grill and exhaust system utilizing the grease filter according of the present invention.

The present invention relates to a system for exhausting grease and/or oil laden hot air from a kitchen or like area. An example of such a setup is illustrated in FIG. 1 in which a canopy 10 extends above food preparation apparatus 12 for receiving grease laden air rising therefrom. The apparatus 12 can include, for instance, a grill, stove, broiler, range or the like, and the canopy 10 typically has a mouth 14 providing an exhaust path for air to exit the building. Fans (not shown) or the like can be located upstream of the mouth 14 in the ventilation system to pull air through the mouth 14.

One or more grease filters 16 can be located in the mouth 14 of the canopy 10. Each grease filter 16 provides a tortuous path "P" for air laden with grease, oil and like contaminants so that the contaminants adhere to the surfaces of the grease filter 16 and are thereby removed from the air. The grease filters 16 are typically positioned on a slant within the mouth 14 of the canopy 10 so that, when grease or like substance accumulates within any of the plurality of gutter-shaped elongate baffles 18 of the grease filter 16, the grease slides down the baffles 18 and is directed to a holding reservoir (not shown).

Periodically, the grease filters 16 require cleaning. Thus, according to the present invention, the grease filters 16 are removable from the canopy 10 and are able to be cleaned in an efficient manner before being re-installed in the canopy 10.

As best illustrated in FIG. 2, the grease filter 16 according to the present invention includes a lower baffle assembly 20 and an upper baffle assembly 22. Each assembly includes a peripheral frame 24 and 26, respectively, which supports an array of baffles 18 in a central opening thereof. In a closed position as shown in FIG. 2, the grease filter 16 define tortuous paths "P" that enter the filter 16 via spacing provided between the array of baffles 18a of the lower baffle assembly 20, that are deflected downwardly into the baffles 18a by baffles 18b of the upper baffle assembly 22, and that are then directed upwardly between the baffles 18b and out of the filter 16. To create these paths, the baffles in each assembly are laterally spaced-apart providing openings therebetween, and the baffles in the opposed assemblies are staggered relative to one another to eliminate any paths for grease laden air to pass directly through the grease filter 16 without impinging upon at least one baffle.

Typically, grease carried in passing air adhere to surfaces 28 of baffles 18b and drip onto surfaces 30 of baffles 18a, or adhere directly to surfaces 30. Thereafter, baffles 18a function as a channel, or gutter, and direct the accumulation of grease under the force of gravity to an end wall 32 of the grease filter 16. The endwall 32 has a series of drainage apertures 34 through which the grease travels on its way to a holding reservoir (not shown).

Figure 4:
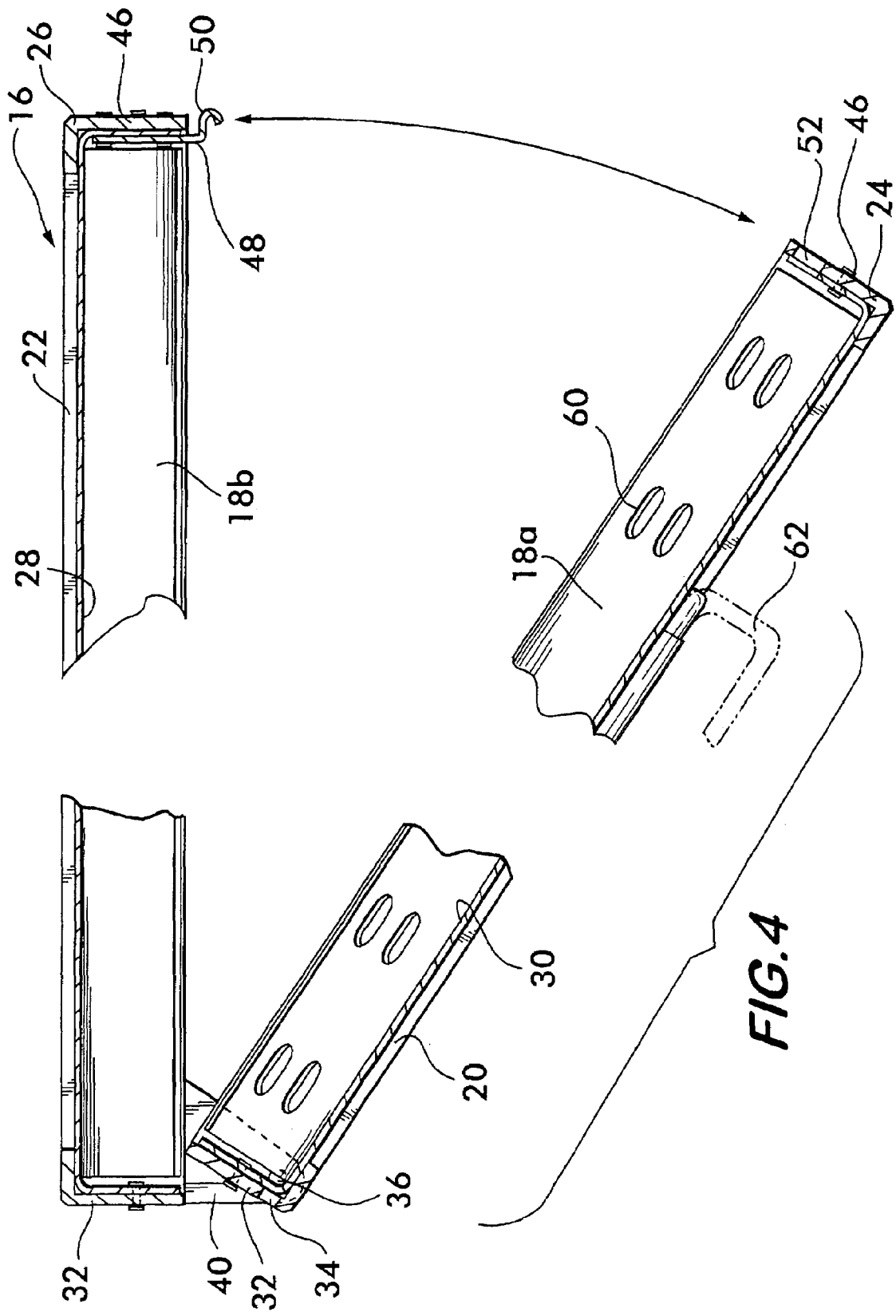
FIG. 4 is a discontinuous cross-sectional view of the grease filter in a partially open position according to the present invention.

The frames, 24 and 26, of the lower and upper baffle assemblies, 20 and 22, are connected by a hinge 36 adjacent to the end wall 32. For example, the hinge 36 illustrated in FIGS. 2 and 4 are provided as pins 38 extending from a triangular ear 40 of the upper baffle assembly 22 and a side wall 42 of the frame 24. Of course, other hinge mechanisms can be utilized. As best illustrated in FIG. 4, the hinge 36 permits the lower and upper assemblies, 20 and 22, to pivot about pins 38 from the closed position illustrated in FIG. 2 to an open position illustrated in FIG. 4. Preferably, the hinge 36 permits the assemblies 20 and 22 to pivot 180° about pins 38 so that all surfaces are exposed for efficient and effective cleaning, including surfaces 28 and 30 of the baffles.

As best illustrated in FIGS. 3 and 4, the grease filter 16 includes a locking mechanism 44 for use in securing the assemblies, 20 and 22, in the closed position. The locking mechanism 44 is located on an end wall 46 of the frames, 24 and 26, opposite from the hinge 36. This location permits the locking mechanism 44 to remain relatively clean and prevents it is from becoming contaminated with grease or the like to ensure the locking mechanism 44 remains in a useful condition for long term and repeated use. The illustrated embodiment of the locking mechanism 44 is provided as a resilient locking tab 48 extending from the end wall 46 of the peripheral frame 22 and having an outwardly projecting curved end 50. The end 50 can be captured in a locking opening 52 formed in the end wall 46 of the peripheral frame 20. Thus, in the closed position, the curved end 50 is captured in opening 52 preventing relative movement between assemblies, 20 and 22. See FIG. 3. However, pressure can be applied to the curved end 50 to deflect it inwardly so that the assemblies, 20 and 22, can be pulled apart and pivoted about hinge 36. Since the tab 48 is resilient, it automatically snaps into the opening 52 when the assemblies, 20 and 22, are pivoted into the closed position.

By way of example, the grease filter 16 can be made of stainless steel, galvanized steel, aluminum or a like material. The grease filter 16 can be rectangular with dimensions in a closed position of about one to three feet by about one to three feet by about several inches. Of course, the grease filter can be made to any dimensions, as desired. Preferably, a pair of handles 62 are pivotally connected to the peripheral frame 24 of the lower baffle assembly 20 enabling ready handling of the grease filters 16 during installation and removal relative to the canopy 10.

Preferably, each baffle has an elongated base wall 54 with opposite sidewalls 56 and 58 extending transversely therefrom to define a channel, or gutter, which extends from end wall 46 to end wall 32 of the grease filter 16. Preferably, the sidewalls 56 and 58 of the baffles 18a in the lower baffle assembly 20 have an array of apertures 60 that reduce static pressure and increase the turbulence of air traveling through the grease filter 16 thereby increasing the ability of the grease filter 16 to remove grease and like contaminants from passing air. As best illustrated in FIGS. 3 and 4, the array of apertures 60 include pairs of apertures uniformly spaced apart along the length of the baffles. This enables uniform flow throughout the length of the baffles.

A further aspect of the present invention relates to a method of efficiently and effectively cleaning a grease filter 16 of a kitchen ventilating system. The grease filter 16 is removed from the mouth 14 of the canopy 10 which is located above food preparation apparatus 12. The grease filter 16 has upper and lower baffle assemblies 20 and 22 which, in a closed position, define tortuous paths "P" for exhausting air therethrough. The filter 16 also has a hinge 36 connecting the upper and lower baffle assemblies, 20 and 22.

A locking mechanism 44 that is located on a peripheral side of the assemblies, 20 and 22, opposite the hinge 36 secures the assemblies, 20 and 22, in the closed position. The method includes the steps of unlocking the mechanism 44 and pivoting the upper and lower baffle assemblies, 20 and 22, relative to each other about the hinge 36. This places the assemblies, 20 and 22, in an open position and permits all surfaces of the grease filter 16 to be cleaned.

As discussed above, preferably the locking mechanism 44 of the grease filter 16 of the present invention includes a resilient locking tab 48 extending from the outer peripheral frame, 24 or 26, of one of the upper and lower baffle assemblies, 20 and 22, and a locking tab opening 52 in the outer peripheral frame, 24 or 26, of the other baffle assembly, 20 and 22. The step of unlocking the assemblies can include pressing the locking tab 48 inwardly to release the tab 48 from the tab opening 52 and simultaneously pulling the assemblies, 20 and 22, apart so that the assemblies, 20 and 22, pivot about the hinge 36.

The grease filter 16 can be manually cleaned with soap and a brush or can be cleaned in an automatic dishwasher or pot sink. After the grease filter 16 is cleaned, the assemblies, 20 and 22, can be pivoted into a closed position. The resilient nature of the locking tab 48 causes it to be automatically seated and captured within the locking tab opening 52. Thereafter, the grease filter 16 can be installed within the mouth 14 of the canopy 10.

While preferred exhaust systems, grease filter devices, and cleaning processes have been described in detail, various modifications, alterations, and changes may be made without departing from the spirit and scope of the system, device and process according to the present invention as defined in the appended claims.

The invention claimed is:

1. A grease filter, comprising:
    upper and lower baffle assemblies which, in a closed position, define tortuous paths for exhaust air flowing therethrough;
    a hinge connecting said upper and lower baffle assemblies thereby permitting said assemblies to pivot relative to one another from said closed position to an open position enabling ready access to all surfaces of said assemblies for purposes of cleaning said assemblies; and
    a locking mechanism for securing said assemblies in said closed position, said locking mechanism being located on a peripheral side of said assemblies opposite said hinge;
    each of said baffle assemblies including an array of spaced-apart baffles, and each of said baffles having an elongated base wall with opposite sidewalls extending transversely therefrom to define a channel;
    said sidewalls of said baffles in said lower baffle assembly have a plurality of apertures; and
    in said closed position, said baffles in said upper baffle assembly being staggered relative to said baffles in said lower baffle assembly to define said tortuous paths.

2. A grease filter according to claim 1, wherein each of said baffle assemblies includes an outer peripheral frame defining a central opening and wherein said array of spaced-apart baffles are connected to said frame and extend across said central opening.

3. A grease filter according to claim 2, wherein said locking mechanism is located on said outer peripheral frames.

4. A grease filter according to claim 3, wherein said locking mechanism includes a resilient locking tab extending from said outer peripheral frame of one of said upper and lower baffle assemblies and a locking tab opening in said outer peripheral frame of the other of said upper and lower baffle assemblies, whereby, in said closed position, said assemblies are locked together when said resilient locking tab is captured within said locking tab opening.

5. A grease filter according to claim 4, wherein said outer peripheral frames are rectangular.

6. A grease filter according to claim 5, wherein said hinge is located on one side of said rectangular frames and said locking mechanism is located on an opposite side of said rectangular frames.

7. A grease filter according to claim 2, wherein a pair of handles are connected to said outer peripheral frame of said lower baffle assembly.

8. A grease filter according to claim 7, wherein said upper and lower baffle assemblies are made of stainless steel, galvanized steel or aluminum.

9. A kitchen ventilating system, comprising:
food preparation apparatus selected from a group consisting of a grill, a broiler, a range and a stove;
a canopy located above said apparatus for exhausting air rising upwardly from said apparatus and laden with grease or oil vapors; and
at least one grease filter removably mounted within a mouth of said canopy;
said grease filter having upper and lower baffle assemblies which, in a closed position, define tortuous paths for exhaust air flowing therethrough;
said grease filter having a hinge connecting said upper and lower baffle assemblies thereby permitting said assemblies to pivot relative to one another from said closed position to an open position enabling ready access to all surfaces of said assemblies for purposes of cleaning said assemblies; and
said grease filter having a locking mechanism for securing said assemblies in said closed position, said locking mechanism being located on a peripheral side of said assemblies opposite said hinge;
each of said baffle assemblies including an array of spaced-apart baffles, and each of said baffles having an elongated base wall with opposite sidewalls extending transversely therefrom to define a channel;
said sidewalls of said baffles in said lower baffle assembly have a plurality of apertures; and
in said closed position, said baffles in said upper baffle assembly being staggered relative to said baffles in said lower baffle assembly to define said tortuous paths.

10. A kitchen ventilating system according to claim 9, wherein each of said baffle assemblies of said grease filter includes an outer peripheral frame defining a central opening and and wherein said array of spaced-apart baffles are connected to said frame and extend across said central opening.

11. A kitchen ventilating system according to claim 10, wherein said locking mechanism of said grease filter is located on said outer peripheral frames.

12. A kitchen ventilating system according to claim 11, wherein said locking mechanism of said grease filter includes a resilient locking tab extending from said outer peripheral frame of one of said upper and lower baffle assemblies and a locking tab opening in said outer peripheral frame of the other of said upper and lower baffle assemblies, whereby, in said closed position, said assemblies are locked together when said resilient locking tab is captured within said locking tab opening.

13. A grease filter, comprising:
upper and lower baffle assemblies defining tortuous paths for exhaust air flowing therethrough;
each of said baffle assemblies including an outer peripheral frame defining a central opening and an array of spaced-apart baffles connected to said frame and extending across said central opening, said baffles in said upper baffle assembly being staggered relative to said baffles in said lower baffle assembly to define said tortuous paths;
each baffle having an elongated base wall with opposite sidewalls extending transversely therefrom to define a channel; and
said sidewalls of said baffles in said lower baffle assembly each having a uniform array of spaced-apart apertures along a length thereof.

14. A grease filter according to claim 13, further comprising:
a hinge connecting said upper and lower baffle assemblies and permitting said assemblies to pivot relative to one another from a closed position to an open position enabling ready access to all surfaces of said assemblies for purposes of cleaning said assemblies; and
a locking mechanism located on said outer peripheral frames for securing said assemblies in said closed position, said locking mechanism being located on a peripheral side of said assemblies opposite said hinge.

* * * * *

UNITED STATES PATENT AND TRADEMARK OFFICE
CERTIFICATE OF CORRECTION

PATENT NO.        : 7,571,721 B2
APPLICATION NO.   : 11/226140
DATED             : August 11, 2009
INVENTOR(S)       : Josue V Aviles Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1001 days.

Signed and Sealed this

Seventh Day of September, 2010

David J. Kappos
*Director of the United States Patent and Trademark Office*